3,337,987
SOIL TREATMENT PROCESS
Donald Alfred Bennett, Beaulieu, England, assignor to The International Synthetic Rubber Company Limited, Southampton, England, a corporation of the United Kingdom
No Drawing. Filed Apr. 26, 1966, Ser. No. 545,241
9 Claims. (Cl. 47—9)

This invention relates to a process for treating the surface of soil to combat erosion thereof. This application is a continuation-in-part of my U.S. application Ser. No. 481,960, filed on Aug. 23, 1965, and now abandoned.

Soil erosion is a phenomenon occurring in a wide variety of situations. It is accelerated by the action of wind and of rain and is worse in conditions of poor soil coherence. In desert areas sand blown by the wind interferes with all forms of transport and surface navigation. The loose surface is scuffed by the wind and seeds of plants that might otherwise germinate are disturbed. In like fashion streams of water formed in rain storms on less pervious soils carry away the surface and can eventually undermine appreciable areas of soils and crops within a short time.

Even in temperate climates where soils are moist surface-caking of clays and silts, which results from initial wetting followed by drying out in hot sunshine, can interfere with the exchange of soil gases and vapors with the air. This phenomenon is known as soil capping.

In the making of cuttings, embankments, or culverts large areas of steeply sloping bare soil are exposed to the weather. Unstable soils require considerable attention before a thriving plant community can be established.

It is also desirable to protect the surface of stock of mineral materials such as coal, or iron ore and the surfaces of waste material from mineral workings and of ash from coal-burning power stations to prevent loss by wind blowing and rain erosion which are both a nuisance and a potential source of serious loss of material.

One process proposed for soil treatment is that of spraying the surface of the soil with oil. However, this method has the serious disadvantage that little or no coherent film is produced. The oil often penetrates into the soil, leaving little or no surface protection. The amount of stabilization obtained is minimal and furthermore the oil treated areas remain sticky for long periods.

Another proposal involves the laying down of a rubber latex. This process, while capable of giving effective stabilization of soil surface layers, is very expensive. Moreover, the surface film of latex is not adapted to wide changes in climatic conditions, tending to be non-plastic and to crack in cold climates and to become gummy and incoherent in warm climates. The use of counter-penetrant additives have been suggested to reduce the shortcomings of the rubber latex, particularly its tendency to become absorbed into the soil without having formed a coherent film.

In my copending application Ser. No. 533,731 I disclose an improved process for overcoming these prior drawbacks by utilization of a rubber latex which has been extended by a substantial quantity of oil. However, I have now discovered that unexpectedly improved results are achieved by applying to the soil an aqueous dispersion of a rubber latex or an oil-extended rubber latex that contains substantial quantities of bitumen material.

It is therefore an object of the present invention to provide an improved method of treating soil and like surfaces to prevent erosion by wind and rain and to improve the texture thereof.

It is a further object of the instant invention to provide a soil surface with a tough, flexible coherent film that is economical to apply and that stabilizes the soil and promotes plant life therein under variant climate conditions.

According to the present invention, there is provided a process for treating the surface of soil or other particulate material comprising forming at the surface thereof a protective film of a mixture of bitumen and natural or synthetic rubber. Conveniently the film may be formed on the surface by spraying a mixture of bitumen emulsion and a rubber latex. The rubber latex may itself be oil extended as disclosed in my co-pending application Ser. No. 533,731.

It is recognized that the term "bitumen" has been used flexibly by the art and that there is no history of consistent meaning. This is particularly true with respect to the meaning applied to the term in Europe as opposed to that used in the United States. Insofar as the present application is concerned, including the claims, the term "bitumen" means a non-crystalline solid or semi-solid cementitious material derived from petroleum sources, which gradually softens when heated, and which consists essentially of compounds composed predominantly of hydrogen and carbon. Bitumens are black or brown in color and essentially completely soluble in carbon disulfide. Bitumen is generally less expensive than oil and it is far less expensive than rubber latex. As a result, one of the outstanding advantages of the process of the invention is that a much improved soil stabilization film can be laid down at far less cost than was heretofore possible by use of rubber latex alone. Consequently, even marginal lands can now be feasibly treated so as to support plant life.

The presence of the bitumen itself gives valuable characteristics to the soil stabilizing film.

In the presence of bitumen the oxidation resistance of the protective film is improved. It has been found that when bitumen is in the protective film oxidation of the rubber is confined to the top exposed surface of the film. This has been demonstrated by infra-red spectrophotometric examination of microtome sections of a film which has been exposed to atmospheric conditions.

The compatibility of the bitumen material with oil permits both components to be used to advantage in a single emulsion together with rubber latex. The relative amounts of oil and bitumen can be changed widely to tailor the film for specific applications. For instance, as the loading of bitumen is increased, the protective film becomes darker in color, it absorbs more heat and its hardness and strength also are increased, while its flexibility and low temperature properties are reduced. On the other hand, however, as the oil loading is increased, the flexibility and low temperature properties are improved. Thus, by selecting an appropriate blend of bitumen/oil/rubber, a protective film may be formed having good all around properties to suit particular prevailing conditions. High bitumen loadings, say up to 10 parts per part of rubber and oil, are useful in applications where temperatures are apt to be severely hot. This is frequently the case in the very areas where soil stabilization is most urgently needed, i.e., arid lands. On the other hand, the bitumen content can be reduced and that of the oil increased in formulations to be used in cold climates. It will be appreciated that good hard and fast rules cannot be laid down governing the selection of relative loadings of bitumen, oil and rubber. The selection has to be done by tests and experiments to take into consideration the conditions existing at the particular site where the protective film is to be formed.

With regard to handling properties, it has been found that with higher proportions of rubber to bitumen, spraying properties and drying times of a bitumen emulsion/rubber latex mixture are improved.

A variety of rubbers may be used in the present invention. It has been found that styrene/butadiene, butadiene/acrylonitrile, butadiene/styrene/acrylate, styrene/ isoprene, styrene/isoprene/acrylonitrile, isoprene/acrylonitrile copolymers and polychloroprene, polybutadiene, polyisoprene polymers may all be usefully employed in the present invention. From the cost point of view styrene/butadiene is particularly suitable.

It has also been found that natural rubber may be successfully employed in the practice of the present invention. Thus a natural rubber latex may be mixed with a bitumen emulsion. When using natural rubber it is required that suitable emulsifying agents should be added to prevent coagulation due to destabilization of the natural rubber latex on the addition thereto of the bitumen emulsion.

Artifically prepared latices of solution polymerized polymers have also been used successfully in the present invention. In general, these artificial latices are prepared by emulsifying the polymer solution in a suitable aqueous emulsifying medium and stripping off the polymerization solvent to leave the artificial "latex."

When using a mixture of bitumen and rubber, with no oil, a suitable blend is that of the ratio nine parts by weight of bitumen to one part by weight of rubber. This ratio is not absolutely critical because as mentioned above, the bitumen loading may be chosen to suit the prevailing conditions at a particular site of intended use. The amount of oil may vary and may be up to ten parts by weight to one part by weight of rubber. A practical maximum bitumen/oil/rubber ratio is 10:10:1. When the composition contains more than about 20 parts of non-rubber solids, the required coherency and flexibility of the resulting film are endangered.

In the bitumen emulsion/rubber latex mixture, the concentration of the non-aqueous constituents preferred should be 25% by weight to give an aqueous mixture suitable for spraying. Again, however, this concentration is not critical and may be varied to suit the particular spraying equipment that is used.

The rate of application is chosen to suit the requirements of film thickness and may be up to five ounces of dry solids (i.e., bitumen, rubber and oil) per square yard. It will, of course, be realized that as the rate of application is increased, so the cost is increased as well as the thickness of the resultant film.

According to the invention, however, the rate of application should be sufficient to leave a film that will promote plant life in the stabilized soil. To this end the film should be no thicker than is required to permit the escape and passage of soil gases or other vapors essential to plant growth. Naturally, exposure to light and air are essential. The degree of water permeability of the film is a matter of choice depending on the specific needs of the sites.

The spraying of a mixture of bitumen emulsion and rubber latex with or without the presence of oil onto the surface of the soil or other particulate material produces a film after evaporation of the water. This film adheres to the particles of the surface. Depending upon the rate of application, the film may be substantially continuous and may be either impermeable or porous to moisture.

The specifications of bitumens used in the process of the invention vary widely within the definition given above. In general, however, the most useful bitumens have the following characteristics:

Softening point (ring and ball) _____° F__ 90–135
Penetration (77° F., 100 g., 5 sec., mm/10) ____ 35–190
Flash point (min.) _____° F__ 450

Particularly useful bitumens are straight-reduced residuals. These are cheap and readily available. Also particularly desirable bitumens are those having a very low asphaltene content and are hence relatively soluble in naphtha. Such bitumens are, by definition, high in maltene content.

When oil is used to extend the rubber, clearly an oil must be chosen which is compatible with the particular rubber being used. It is preferred to use a mineral oil but aromatic and napthenic oils are suitable as also are many fuel and lubricating oils.

In Table I below there is reported the results of wind tunnel tests on the stabilization qualities on a soil of a bitumen/rubber blend in comparison with other types of application. In this instance, the bitumen was completely naphtha soluble, and met the British Standards Sepcification No. 434, 1960 "Bitumen Anionic Emulsions," wherein:

Softening point _____° F__   <120
Penetration (77° F. 100 g., 5 secs., mm./10) _____   100–350
Loss of weight at 163° C. for 5 hours (percent max.) _____   2.0

The oil used was a highly aromatic one having the following characteristics:

Aromatic carbon _____percent__   41
Napthenic carbon _____do____   22
Paraffinic carbon _____do____   37
Molcular weight _____ 250 to 430
Viscosity at 210° F. _____centistokes__  18 to 25

The rubber was a synthetic copolymer latex of butadiene and styrene.

TABLE I

| Sample No. | Type | Application Rate, oz. per sq. yd. | Concentration, Percent | Max. Wind Speed Before Failure, ft./min. |
|---|---|---|---|---|
| 1 | 9:1 bitumen/rubber | 1½ | 20 | 3,000 |
| 2 | Bitumen | 1½ | 20 | 1,840 |
| 3 | 9:1 oil/rubber | 1½ | 20 | 2,070 |
| 4 | Oil | 3 | 20 | 1,000 |

It is seen from this table that the presence of the bitumen in the emulsion gives the resulting film a remarkably improved resistance to erosion by wind. Due to the toughness of the bitumen and its resistance to oxidation, the film will tend to outlast the others.

In Table II below, there are shown the proportions by weight of rubber, oil and bitumen in various mixtures and which have proved successful.

TABLE II

| Rubber | Oil | Bitumen | Film Characteristics |
|---|---|---|---|
| 1 | 5 | 1 | Good light colored film. |
| 1 | 3 | 1.5 | Good darkening film. |
| 1 | 5 | 2 | Good darkening film. |
| 1 | 5 | 3 | |
| 1 | 5 | 4 | Good darker film. |
| 1 | 9 | 1 | |
| 1 | 9 | 1.5 | Same trend. |
| 1 | 9 | 2 | |
| 1 | 9 | 3 | |
| 1 | 9 | 4 | Flexibility of film increasing and low temperature properties improving. |
| 1 | 0 | 9 | |
| 1 | 0 | 5 | |
| 1 | 0 | 3 | |

What I claim is:
1. A process for stabilizing soil against erosion comprising forming at the surface thereof a protective film of a mixture of bitumen and a rubber, said film having a thickness sufficient to sustain plant life in the underlying soil, and the weight ratio of bitumen to rubber in said film being between about 1:1 and 20:1, respectively.

2. A process for stabilizing soil against erosion comprising applying to the soil surface an aqueous dispersion of a mixture of a rubber latex and a bitumen emulsion in amounts sufficient, upon evaporation of the water, to form a coherent film over the soil while permitting the sustenance of plant life therein, said dispersion containing a weight ratio of bitumen to rubber of between about 1:1 and 20:1, respectively.

3. The process according to claim 2 wherein the amount of bitumen in the mixture is in the range of one to ten parts by weight of bitumen to one part by weight of rubber.

4. The process according to claim 2 wherein the rubber is extended by a compatible oil in the range of one to ten parts by weight of oil to one part by weight of rubber and wherein the weight ratio of oil and bitumen to rubber is no greater than about 20:1.

5. The process according to claim 2 wherein the bitumen is characterized by a flash point greater than 450° F., a softening point between about 90 and 135° F. and a penetration (77° F., 100 g., 5 sec., mm./10) between about 35 and 190.

6. The process according to claim 2 wherein the bitumen is characterized by a softening point of less than 120° F., a penetration (77° F., 100 g., 5 sec., mm./10) of between about 100 and 350 and substantially complete solubility in naphtha.

7. The process according to claim 2 wherein the dispersion comprises an emulsion polymerized latex of a butadiene-styrene copolymer and an anionic bitumen emulsion.

8. The process for stabilizing soil against erosion comprising applying to the soil surface an aqueous dispersion of a bitumen and an oil-extended rubber in an amount sufficient, upon evaporation of the water, to form a coherent film over the soil while still permitting the sustenance of plant life in said soil, said film being composed of one to ten parts by weight of bitumen to one to ten parts by weight of oil to one part by weight of rubber.

9. The process according to claim 8 wherein the bitumen is characterized by a flash point greater than 450° F., a softening point between about 90 and 135° F. and a penetration (77° F., 100 g., 5 sec., mm./10) of between about 35 and 190.

References Cited
UNITED STATES PATENTS

| | | | |
|---|---|---|---|
| 2,550,371 | 4/1951 | Naps et al. | 260—28.5 |
| 2,961,799 | 11/1960 | Coe | 47—9 |
| 2,978,427 | 4/1961 | Puller et al. | 260—28.5 |
| 3,061,975 | 11/1962 | Hibshman et al. | 47—9 |
| 3,094,809 | 6/1963 | Kaufman et al. | 47—9 |

ABRAHAM G. STONE, *Primary Examiner.*

ROBERT E. BAGWILL, *Examiner.*